United States Patent [19]

Clausen et al.

[11] Patent Number: 4,561,720

[45] Date of Patent: Dec. 31, 1985

[54] TRANSPARENT REAR PROJECTION SCREEN

[75] Inventors: Erik Clausen; Johannes Clausen, both of Gentofte, Denmark

[73] Assignee: Scan Screen A/S, Roskilde, Denmark

[21] Appl. No.: 656,997

[22] Filed: Oct. 2, 1984

[30] Foreign Application Priority Data

Oct. 12, 1983 [DK] Denmark .............................. 4704/83

[51] Int. Cl.$^4$ .............................................. G03B 21/60
[52] U.S. Cl. ...................................... 350/128; 350/129
[58] Field of Search ................................. 350/127–129

[56] References Cited

U.S. PATENT DOCUMENTS

| | | | |
|---|---|---|---|
| 4,418,986 | 12/1983 | Yata et al. | 350/128 |
| 4,468,092 | 8/1984 | Inoue et al. | 350/128 |
| 4,469,402 | 9/1984 | Yata et al. | 350/128 |

FOREIGN PATENT DOCUMENTS 180418  12/1954  Austria ................................. 350/128

*Primary Examiner*—Richard A. Wintercorn
*Attorney, Agent, or Firm*—Watson, Cole, Grindle & Watson

[57] ABSTRACT

A transparent rear projection screen has a Fresnel lens for paralleling light arriving from behind. In the front surface the screen is provided with grooves which extend in the vertical direction in the position of use of the screen. Each of the side flanks of the grooves adjoins a side part of an adjacent, also vertically extending convex lens. The side flanks of the grooves are totally reflecting to parallelled light arriving from behind in order to increase the deflection in the lateral direction of a part of the light arriving from behind by means of reflection into the adjacent lens. The angle which a side flank forms together with the side part of the adjacent lens is so small that total reflection from the inner surface of the side part of the lense of light which is totally reflected of the side flank in question is avoided. Moreover, between the vertical lenses to which the side flanks adjoin, at least one further lens is arranged. The further lens has the cross section of an iscoceles triangle with a rounded top which faces forward with respect to the screen. The side surfaces of the triangular lenses form an angle together with a normal to the screen which is so small that that side surfaces are totally reflecting to parallelled light arriving from behind. Moreover, the angle which the side surfaces of the triangular lenses forms together with the normal to the screen is so great that the side surfaces of the triangular lenses allow emission of light reflected towards the side surfaces from surfaces opposite thereto.

9 Claims, 6 Drawing Figures

TRANSPARENT REAR PROJECTION SCREEN

BACKGROUND OF THE INVENTION

The present invention relates to a transparent rear projection screen having a Fresnel-lens on its rear side for paralleling light arriving from behind, and which in the front surface of the screen has vertically extending grooves with side flanks, each of which adjoins a side part of an adjacent also vertically extending convex lens, said side flanks being totally reflecting to parallelled light arriving from behind in order to increase the deflection in the lateral direction of a part of the light arriving from behind by reflecting said light into the adjacent lens, whereby the angle which a side flank forms together with the adjacent lens side part is so small that total reflection from the inner surface of said lens side part of light which is totally reflected by means of the side flank in question is avoided, and wherein at least one further lens is arranged between the vertical lenses to which the side flanks adjoin.

A rear projection screen of the kind referred to above is disclosed in Danish Patent Application No. 878/83, filed Feb. 24, 1983 and claiming priority from Feb. 25, 1982 (Japanese Patent Application No. 29178/82) by Mitsubishi Rayon Co. Ltd. According to said application the further lens consists of a convex and as a part of a cylindrical surface shaped lens. This further lens is comparatively broad, seeing that it fills approximately one half of a pitch. By the term "pitch" as used in the present specification, the distance between the bottoms of two adjacent grooves is to be understood. Moreover, the angle which the totally reflecting side flanks form together with the normal to the screen is comparatively great, viz. approximately 20°. The result is that the lenses to which the flanks adjoin become rather small and have a comparatively great inclination with respect to the normal to the screen. The result is that parallelled light which arrives from behind and impinges the flanks will be diverged and refracted strongly in the lateral direction when such light emits from the lenses to which the flanks adjoin. Moreover, a part of the light arriving from behind, viz. the light which impinges the parts of the flanks positioned adjacent the bottoms of the grooves will be totally reflected into the further lens so that this light is totally reflected from the inner surface of the further lens. This, in particular, will be the case when the rear projection screen is used for projecting colour television pictures which are produced by three projectors for television pictures, each of which projects its own picture towards the rear side of the screen, and wherein the pictures issued by each of the three projectors has its own colour, e.g. red, green and blue. Furthermore, if the further lens is to spread the parallelled light arriving from behind sufficiently in the lateral direction, the further lens must have a pronounced curvature, i.e. it must have a comparatively small radius of curvature. However, if this is the case the side parts of the further lens will form angles together with a normal to the screen so small that the side parts of the further lens will become totally reflecting to light arriving from behind, and accordingly, such light will not issue from the screen. Furthermore, a strongly curved further lens will result in that the light which issues from the further lens will hit the lenses to which the flanks adjoin whereby the path of rays, under the best conditions, will be randomly distributed. However, if the further lens is very flat, the spreading in the lateral direction will be correspondingly small, and a comparatively great part of the light arriving from behind will be issued in the direction of the normal to the screen which, however, has the effect that a person which views the screen in front thereof and opposite the centre of the screen will perceive the picture in question as being too light, whereas a person who views the screen under a greater or smaller lateral viewing angle will perceive the screen as too dark.

SUMMARY OF THE INVENTION

According to the invention, the cross section of the further lens is shaped as a isosceles triangle having a rounded top and the side surfaces of the triangular lens form an angle with the normal to the screen which is so small that the side surfaces are totally reflecting to parallelled light arriving from behind, and simultaneously said angle is so great that the side surfaces of the triangular lenses allow emission of light reflected towards said side surfaces from the side surfaces opposite thereto. By means of such screen it is achieved that a viewer which sees the picture projected will perceive the picture as being generally equally illuminated, no matter whether the person in question is positioned directly in front of the centre of the screen or laterally with respect thereto, because the triangular further lenses will emit an appropriately distributed amount of light from their sides and their tops, and simultaneously also the lenses adjoining the flanks will emit light which is appropriately spread. Moreover, total reflection of light arriving from behind and reflected back into the screen will to a considerable degree be avoided. Moreover, the triangular lenses, at their tops, will cause an appropriate mixing of the colours from three television projectors in case the screen is used in connection with such projectors.

A particularly small loss due to total reflection from the inner surfaces of the lenses which adjoin the totally reflecting side flanks is according to the invention achieved, provided the side parts of the lenses adjoining the side surfaces of the triangular lenses, form an angle together with the normal to the screen which is so great that total reflection is avoided as regards parallelled light arriving from behind, and which hit the side parts.

In order to avoid that the lenses which adjoin the totally reflecting side flanks in a too high degree add to emission of light in the direction of the normal to the screen, a further embodiment is according to the invention proposed, according to which the angle which the lens side parts adjacent the side flanks form together with the normal to the screen lies between 85° and 95°, preferably between 88° and 92°, and appropriately is approximately 90°.

DESCRIPTION OF THE PREFERRED EMBODIMENT

Figure 1:
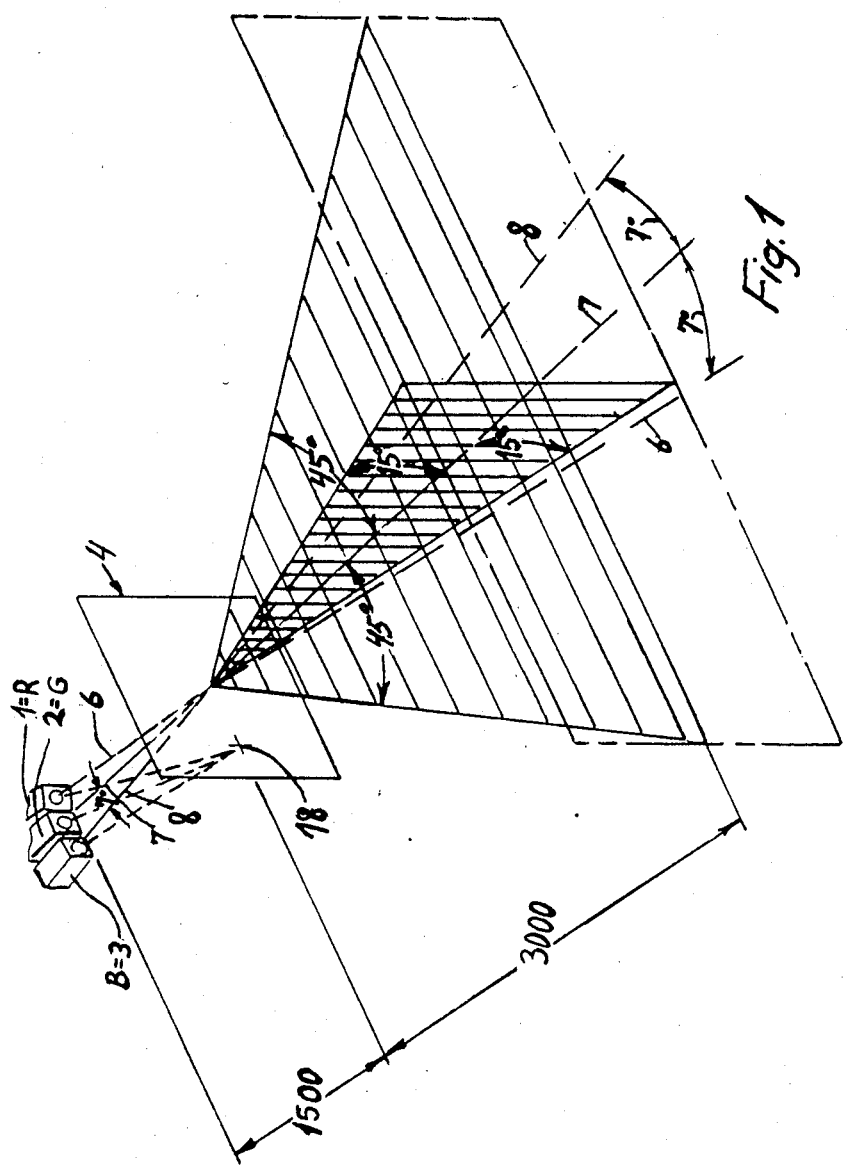
FIG. 1 shows a perspective schematical picture for illustrating a use of projection screens of the kind here in question.

On the drawing, reference numerals 1, 2 and 3 designate three projectors for projecting television pictures towards the rear surface of a projection screen 4. Each of the projectors wmits a black-white television picture, but in front of the projectors 1 a filter is positioned in such a way that the picture emitted from the projector 1 towards the screen 4 will be red, in front of the projector 2 a filter is arranged in such a way that the picture emitted from the projector 2 towards the screen 4 is green, and as regards the projector 3 a filter is used in such a way that the picture issued from the projector 3 will be blue. The three projectors 1, 2 and 3 are arranged side by side with the optical axis 7 of the centre projector 2 extending perpendicular to the centre of the screen 1. Due to the fact that the projectors have a certain dimension in the lateral direction, the projectors cannot be arranged with their axes 6 and 8 coaxially with the axis 7, and instead the three optical axes in pairs form angles of 7° with each other. It is difficult to reduce the 7° with due to the size of the projectors. On the contrary, the development within this branch of the technique goes in direction towards more and more light powerful projectors which accordingly will occupy more space in the lateral direction in such a way that the angle of 7° may rise up to 10°. The three optical axes are directed towards the centre of the screen 4 and furthermore the projectors are so arranged that the pictures projected upon the rear surface of the screen 4 cover each other as exactly as possible. As a result a picture may be watched from the front surface of the screen 4 corresponding to the picture emitted by a colour television picture tube, but of a better quality and of a greater size. In FIG. 1, an auditorium is indicated by means of a frame shown in dotted lines. The formation of the television picture of the screen 4, of course, depends upon the picture forming capacities of the screen which normally are achieved by light diffusing material added to the material of the screen.

On FIG. 1, the path of rays from the three projectors and to the centre of the screen 4 are shown together with the path of rays from the three projectors and to a point 18 of the screen which is positioned to the left of the centre. From FIG. 1 it will be understood that every point of the rear surface of the screen 4 will be hit by a red, a green and a blue light ray, which form the angle explained above with respect to each other.

Figure 2:
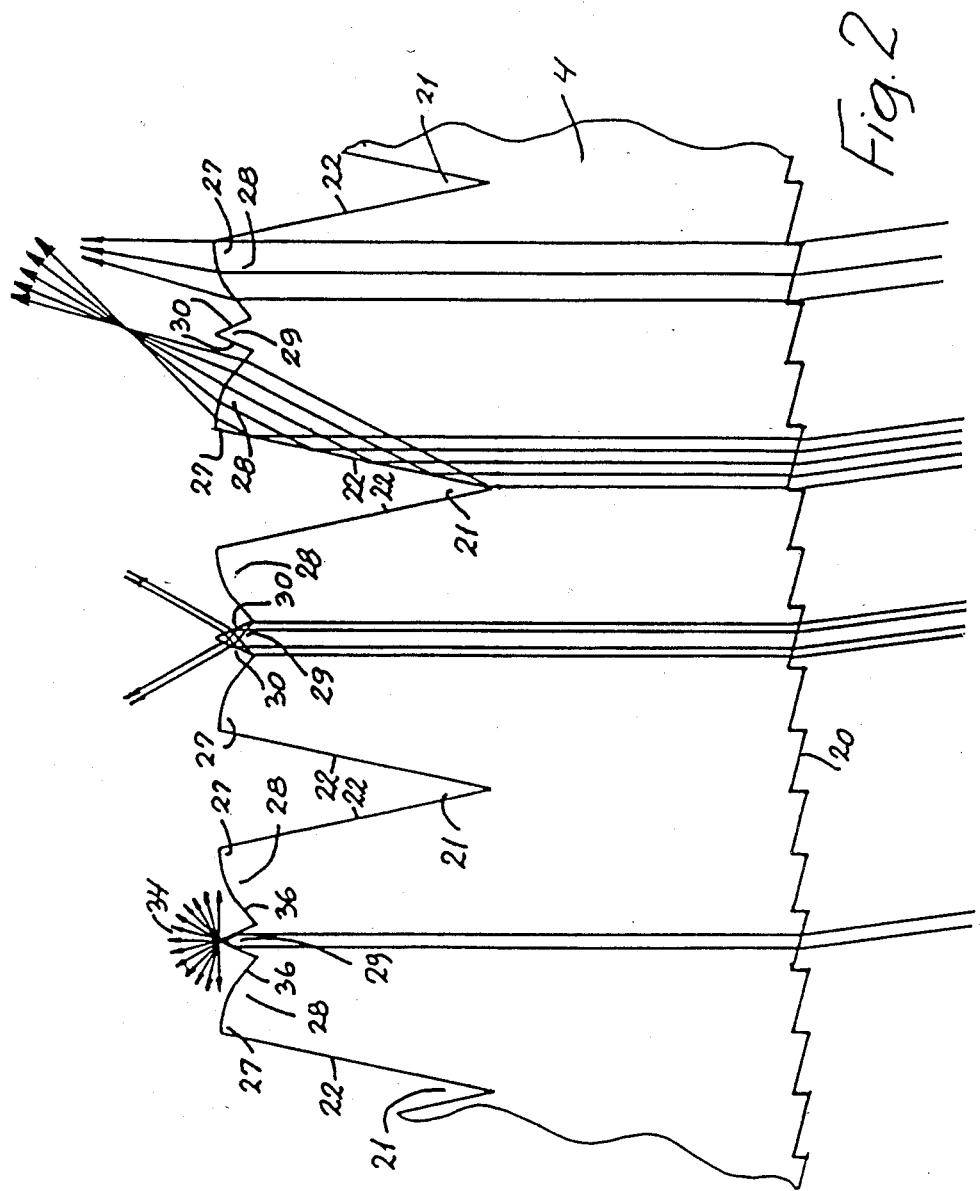
FIG. 2 shows, highly magnified, a horizontal section of a part of an embodiment of the screen according to the invention.

As mentioned above, FIG. 2 shows a part of an embodiment of the screen 4 according to the invention. On the reverse surface of the screen a Fresnel-lens 20 of a kind known per se, is formed and accordingly a light bundle of conical form which is directed towards the rear surface of the screen from the focal point of the Fresnel-lens will be transferred into mutually parallel rays which will extend through the screen parallel with each other and parallel with the normal to the screen. This, accordingly, will be the case as regards the projector 2, FIG. 1. As regards the other two projectors 1 and 3, the rays of the conical bundles of lights emitted therefrom will also be refracted so as to extend parallel with each other as they pass the Fresnel-lens, but after having passed the Fresnel-lens the rays will still form the angle previously referred to, viz. 7°, together with the rays from the projector 2. The rays from the projectors 1 and 3, accordingly, will form angles of 7° with the normal to the screen after having passed the Fresnel-lens 20.

Figure 3:
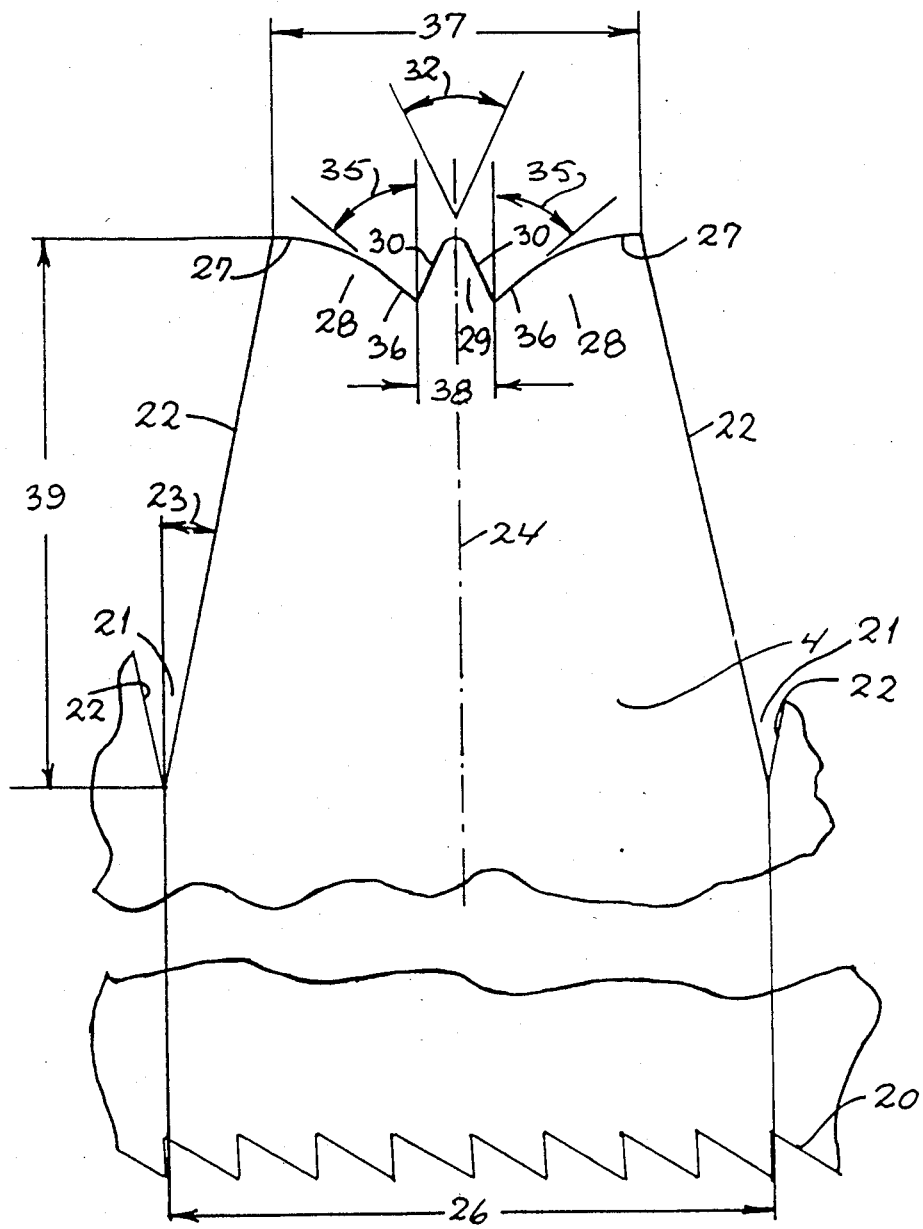
FIG. 3 shows, further magnified, a part of the section shown in FIG. 2.

In the front surface of the screen vertically extending grooves 21 are provided having side flanks 22. The side flanks 22 are totally reflecting and form a comparatively small angle 23 (FIG. 3) together with the normal to the screen which in FIG. 3 is represented by a dotted line 24. On FIG. 2, a section of the screen in question is shown, corresponding to three pitches, whereas in FIG. 3 only a very small section of the screen in question is shown, viz. corresponding to one pitch, viz. corresponding to the part of a screen, which is positioned between the bottoms of two adjacent grooves 21. The width of this pitch is indicated at the bottom of FIG. 3 and designated 26.

The outer edges of each of the flanks 22 adjoin a side part 27 of an adjacent lens 28. Generally, the section of lenses 28 is shaped as a part of a cylindrical surface, and the lenses 28 extend vertically in the position of use of the screen. Between the lenses 28 further lenses 29 having side surfaces 30 are provided. Each screen part corresponding to one pitch is symmetrical about the dotted line 24 which accordingly simultaneously constitutes a centre axis of the screen part in question.

The side surfaces 30 of the further lenses 29 form angles with the normal to the screen so small (and accordingly also form a vertical angle 32 so small) that the side surfaces 30 are totally reflecting as regards light which arrives in parallelism from the Fresnel-lens 20, but simultaneously they are light transparent. In other words, the total reflection is due to the fact that said light impinges the inner surfaces of the side surfaces 30 at an angle of incidence so great that said angle is greater than the angle of incidence at whic refraction out through the side surfaces 30 would occur. As it appears from FIG. 5, the light illustrated therein which impinges the side surfaces 30 of the lens 29 adjacent the top of the lens will be totally reflected towards the top of the lens and the majority of said light will be refracted as indicated by means of the bundle of vectors 34. In this connection it should be noticed that the top of the triangular lens 29 has a radius of curvature lying between 0.005 and 0.04 mm, preferably between 0.01 and 0.03 mm, and appropriately is approximately 0.02 mm. The rays shown in FIG. 6 which, on the contrary, impinge the side surfaces 30 in question at a greater distance from the top of the lens will be reflected towards the opposite side surfaces and due to the fact that the vertical angle 32 simultaneously is sufficiently great, said rays will impinge under angles of incidence so small that the light in question will emit through the surfaces 30 and simultaneously these rays will be refracted. This refraction will correspond to the path of ray from the optically more dense material, the material of the screen, which e.g. may be acryl or a material having corresponding refraction capabilities, and to the optically less dense material, viz. the air. Accordingly, the further lens 29 will contribute to the emission of light in the direction of the normal to the screen (at the top) and will also contribute to the emission of light laterally (at the top and at the bottom). The vertical angle 32 lies between 37° and 58°, preferably between 40° and 50°, and is appropriately approximately 46°.

Figure 4:
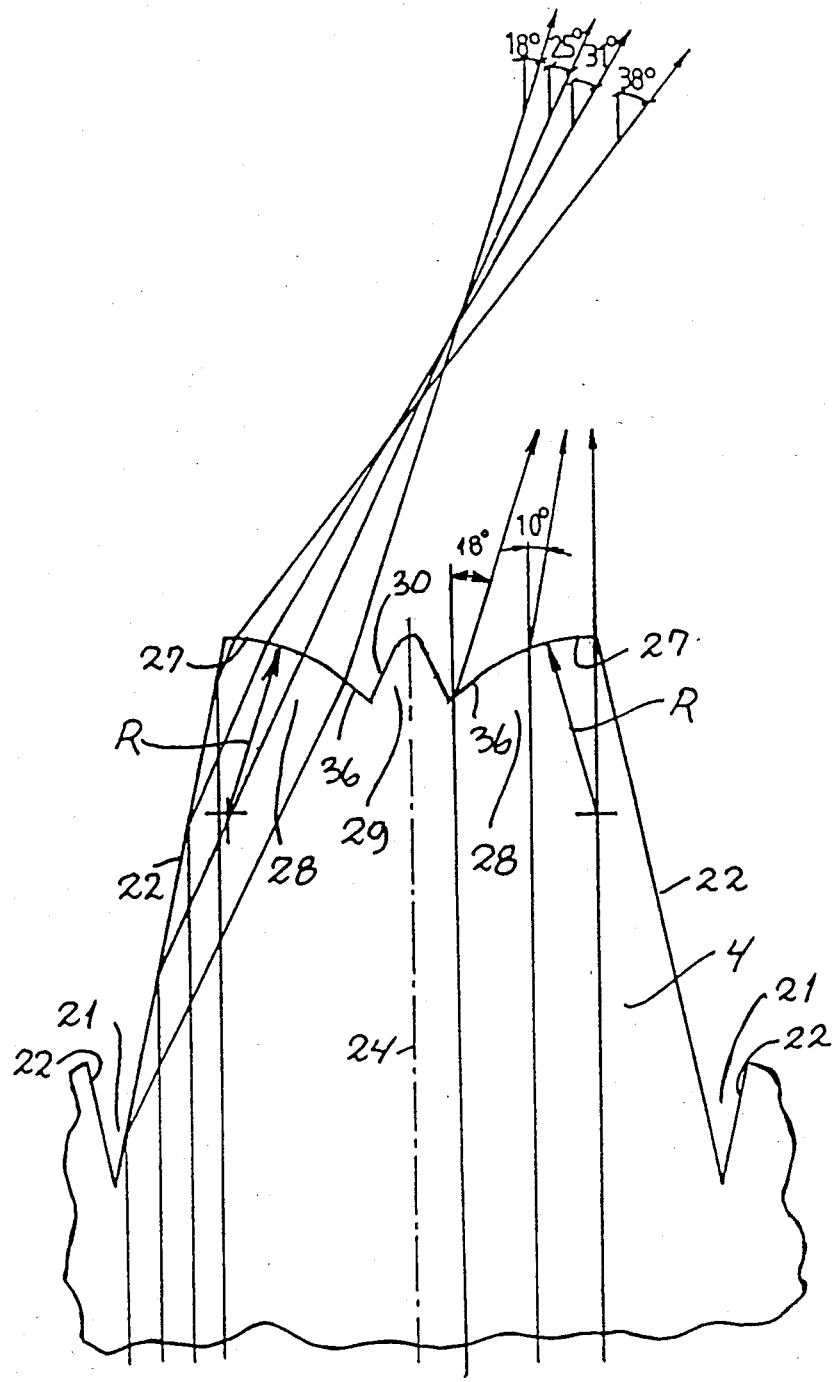
FIG. 4 shows the part of the section shown in FIG. 3 for illustrating a part of the path of rays.
Figure 5:
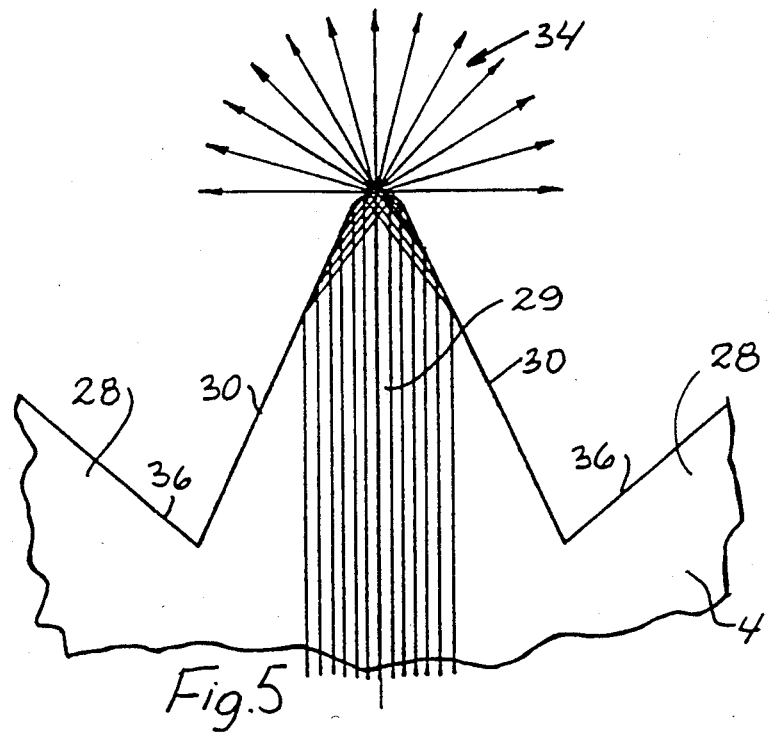
FIG. 5 shows, further magnified, a part of the section shown in FIG. 4, for further illustrating the path of rays.
Figure 6:
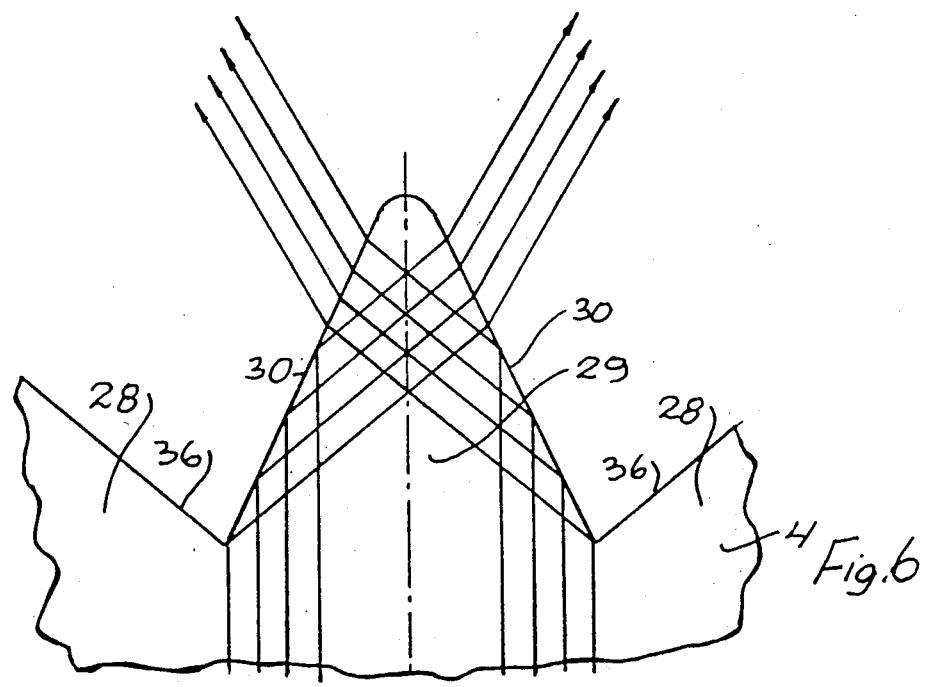
FIG. 6 shows the part of the screen shown in FIG. 5 for illustrating a further part of the path of rays.

It should be mentioned here, that in FIGS. 4, 5 and 6 only the path of ray of the green light issued from the focal point of the Fresnel-lens is illustrated.

The path of rays as regards the light which impinges one of the totally reflecting side flanks 22 parallel with the axis 24 is shown to the left in FIG. 4 and from this figure it will be seen that this light will be totally reflected out through the adjacent lens 28 while being refracted towards the lateral direction.

According to the embodiment illustrated on the drawing, the centres of the lenses 28 are selected positioned on normals to the screen which pass through the intersection lines between the flanks 22 and the lenses 28, and the width of the lenses 28 is selected so that the tangent to the side lens parts 27,27 extends perpendicular to the normal to the screen. Accordingly, the light which impinges a side part 27 adjacent the outer edge of a flank 22 will pass non-refracted out through the lens side part in question, cf. the outermost ray shown to the right in FIG. 4.

However, the angle which the tangent to the side parts 27 adjacent the outer edges of the flanks 22 form together with the normal to the screen may vary between 85° and 95°, preferably between 88° and 92°, and appropriately is approximately 90° as shown on the drawing. By means of this arrangement it is avoided that too much light is emitted through the side parts 27 parallel with the normal to the screen. The angle between the flanks 22 and the adjacent side parts 27 should, however, always be so small that total reflection is avoided from the inner surfaces of the side parts 27, because such totally reflected light will be lost. In this connection it should be mentioned, that the radius of curvature R as regards the lenses 28 lies between 0.15 and 0.4 mm, preferably between 0.2 and 0.35 mm and appropriately is approximately 0.3 mm.

Moreover, the dimensions are selected in such a way that also a ray which impinges the innermost part of a flank 22 parallel with the normal to the screen will be reflected into the adjacent lens 28 and will issue from this lens, cf. the ray shown in FIG. 4 outermost to the left.

The path of rays for parallel light which impinges a lens 28 parallel with the normal to the screen is shown to the right in FIG. 4, and from this figure it will be seen that said light is refracted in the same way as light which leaves a convex lens. It will be noticed that a ray which impinges a lens 28 immediately to the side of the position at which such lens adjoins the side surface 30 of the triangular lens 29 will issue through the lens 28 while being refracted simultaneously. This is due to the fact that the angle 35 which the side parts 36 of the lenses 28 adjoining the side surfaces 30 form together with the normal to the screen, is sufficiently great to prevent total reflection from the side parts 36. Light reflected in this way would otherwise get lost. The angle 35 (FIG. 3) lies between 48° and 54°, preferably between 50° and 54° and is appropriately approximately 50°.

The angle 23, which the side flanks 22 form together with the normal to the screen lies between 8° and 16°, preferably between 10° and 14° and is appropriately approximately 12°. Also the width 38 of the triangular lens 29 may vary e.g. between 0.08 and 0.18 mm, preferably between 0.10 and 0.14 mm and is appropriately approximately 0.12 mm. Moreover the depth 39 of the grooves 21 may vary between e.g. 1.3 and 0.5 mm, preferably between 1.1 and 0.7 mm, and is appropriately approximately 0.9 mm. Also the pith 26 may vary depending upon how big the screen in question should be and may lie between 0.8 and 1.8 mm, preferably between 0.9 and 1.4 mm and is appropriately approximately 1.0 mm.

It will be understood that the distance 37 between the outer edges of the flanks 22 will depend upon the pitch 26 and upon the angle 23.

Above, the path of rays for the green light which passes the screen parallel with the normal to the screen has been explained. The red and the blue light will form an angle of the 7° previously referred to together with the green light. The angle 23 formed by the flanks 22 together with the normal to the screen should accordingly not be less than said 7°, seeing that red light otherwise will be unable to impinge the flanks 22 along one half of the screen, and blue light will not be able to hit the flanks 22 on the other half of the screen, and accordingly a colour difference or a "colour shading" will occur. However, the angle 23 should on the other hand not be too great, because red (respectively blue) light under such condition may hit the flanks 22 under such small angles of incidence that said light will not be reflected out through the adjacent lenses 28, but instead will be reflected to the lenses 29 or even beyond the lenses 29.

It should also be mentioned that the radius of curvature at the top of the lenses 29 is of importance in order to achieve a correct colour distribution, i.e.g in such a way that colour shading is avoided and in such a way that the picture is not red dominated when the screen is viewed from one side and blue dominated when the screen is viewed from the other side, seeing that a colour mixing will occur at the tops of the lenses 29. This will in particular be the case when light diffusing picture forming particles are positioned, viz. at the front surface of the screen.

As previously explained also good viewing conditions are achieved when the screen is viewed in the lateral direction (under a side view angle of ±90°) due to the spreading caused by the flanks 22, the lenses 28 and the lenses 29.

Even though the flanks 22 are totally reflecting solely due to the inclination of the flanks, it is preferred to provide a reflecting covering on the flanks 22 and in order to achieve good contrast effect it is preferred to fill the grooves 21 with a dark colour. The coating by means of a reflecting covering is made because dirt in the grooves 21 otherwise would destroy the total reflection and due to the fact that the grooves, in contradiction to the side surfaces 30 of the lenses 29, are difficult to keep clean. A covering of the flanks 22 with a reflecting coating however, will, reduce the reflexibility of the flanks 22. This is due to the fact that such covering cannot be regarded as covering more than 95% of the surface in question, and if such surface previously has been polished it will have a very high degree of reflection without any coating.

During experience upon which the present invention builds, light measurements were carried out with a screen constructed as here explained, but without the lenses 29 and with lenses 28 having such a width that they passed beyond the points having tangents perpendicular to the normal to the screen. Without any reflecting covering of the flanks 22 and with the flanks polished to a high degree it was proved that a good and even "gain" was achieved, i.e. that the screen appeared generally equally illuminated viewed right from the front of the screen and within appropriate lateral viewing angles. After covering of the flanks 22 with a reflecting covering, a considerable change occur because the screen now appeared as being far stronger illuminated as viewed perpendicular to the screen as viewed in the lateral direction.

Presumably, this is due to the reduced reflecting capacity of the flanks and the reduced light emission in the lateral direction caused by such covering.

By arranging the triangular lenses 29 proposed according to the present invention it has been proved that with the flanks 22 covered with a reflecting coating, a compensation for the drawback referred to above is achieved, because the light emission in the lateral direction is intencified with respect to the light emitted in the direction of the normal to the screen which among other things is due to the fact that the light which the non-coated side surfaces 30 of the triangular lenses emit in the lateral direction compensates for the reduced light emission in the lateral direction which is caused by the coating of the flanks 22.

We claim:

1. A transparent rear projection screen (4) having a Fresnel-lens (20) on its rear side for paralleling light arriving from behind, and which in the front surface of the screen (4) has vertically extending grooves (21) with side flanks (22), each of which adjoins a side part (27) of an adjacent also vertically extending convex lens (28), said side flanks (22) being totally reflecting to parallelled light arriving from behind in order to increase the deflection in the lateral direction of a part of the light arriving from behind by reflecting said light into the adjacent lens (28), whereby the angle which a side flank (22) forms together with the adjacent lens side part (27) is so small that total reflection from the inner surface of said lens side part (27) of light which is totally reflected by means of the side flank (22) in question is avoided, and wherein at least one further lens (29) is arranged between the vertical lenses (28) to which the side flanks (22) adjoin, characterized in that the cross section of the further lens (29) is shaped as an isosceles triangle having a rounded top and that the side surfaces (30) of the triangular lens (29) form an angle with the normal to the screen which is so small that said side surfaces (30) are totally reflecting to parallelled light arriving from behind, said angle simultaneously being so great that the side surfaces (30) of the triangular lenses (29) allow emission of light reflected towards said side surfaces (30) from the side surfaces (30) opposite thereto.

2. A screen as in claim 1, in which the side parts (36) of the lenses (28) adjoining the side surfaces (30) of the triangular lenses (29) form an angle (35) together with the normal to the screen, which is so great that total reflection is avoided as regards parallelled light arriving from behind, and which hits said side parts (36).

3. A screen as in claim 1, wherein the top of the triangular lenses (29) has a radius of curvature lying between 0.005 and 0.04 mm, preferably between 0.01 and 0.03 mm, and appropriately is approximately 0.02 mm.

4. A screen as in claim 1, wherein the side surfaces (30) of the triangular lenses (29) form a vertical angle lying between 37° and 58°, preferably between 40° and 50°, and aprropriately is approximately 46°.

5. A screen as in claim 1, in which the triangular lenses (29) at their basis have a width (38) lying between 0.08 and 0.18 mm, preferably between 0.10 and 0.14 mm, and which appropriately is approximately 0.12 mm.

6. A screen as in claim 1, in which the angle (23) which the totally reflecting side flanks (22) form together with the normal to the screen lies between 8° and 16°, preferably between 10° and 14°, and appropriately is approximately 12°.

7. A screen as in claim 1, in which the side parts (36) of the lenses (28) adjoining the side surfaces (30) of the triangular lenses (29) form an angle (35) together with the normal to the screen which is so great that total reflection is avoided as regards parallelled light arriving from behind, and which hits said side parts (36), and in which the lens side parts (36) adjoining the side surfaces (30) of the triangular lenses (29) form an angle (35) with the normal to the screen lying between 48° and 54°, preferably between 50° and 54° and which appropriately is approximately 50°.

8. A screen as in claim 1 in which the lenses (28) adjacent the totally reflecting flanks (22) are shaped as a part of a cylinder having a radius of curvature R lying between 0.15 and 0.4 mm, preferably between 0.2 and 0.35 mm, and which appropriately is approximately 0.3 mm.

9. A screen as in claim 1, in which the angle which the lens side parts (27) adjacent the side flanks (22) form together with the normal to the screen lies between 85° and 95°, preferably between 88° and 92° and appropriately is approximately 90°.

* * * * *